No. 674,592. Patented May 21, 1901.
J. H. BAKER.
BRAKE LEVER.
(Application filed Dec. 3, 1900.)
(No Model.) 2 Sheets—Sheet 1.
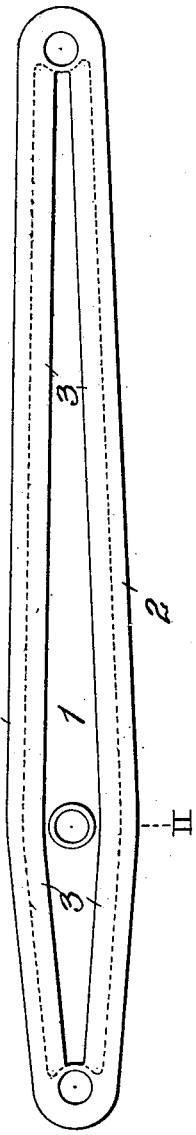
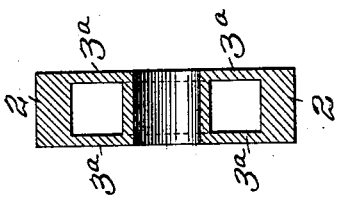
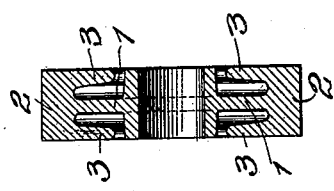
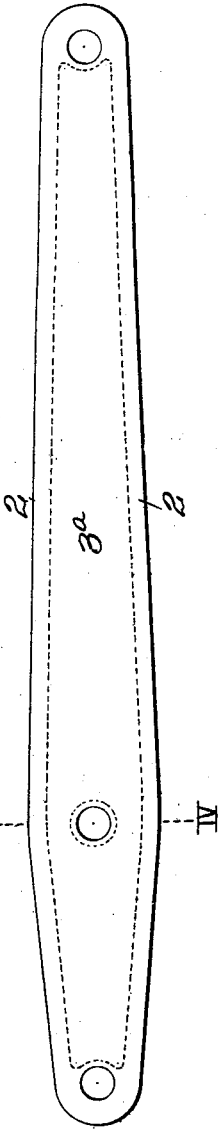
WITNESSES:
Herbert Bradley.
F. E. Gaither.
INVENTOR
James H. Baker
by Dennis S. Wolcott Att'y.

No. 674,592. Patented May 21, 1901.
J. H. BAKER.
BRAKE LEVER.
(Application filed Dec. 3, 1900.)
(No Model.) 2 Sheets—Sheet 2.
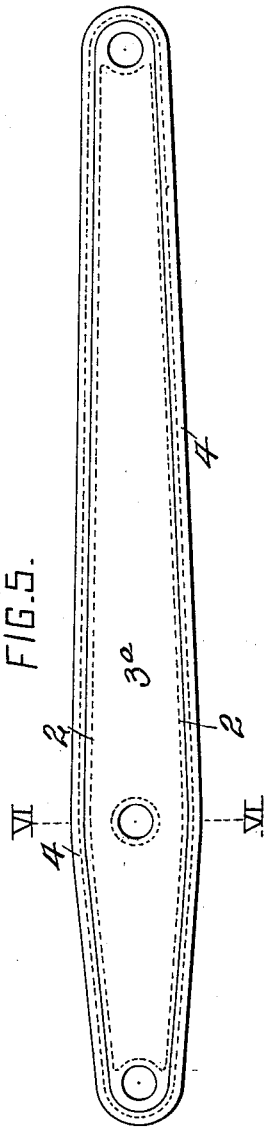
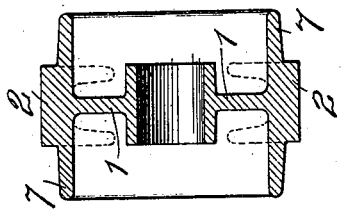
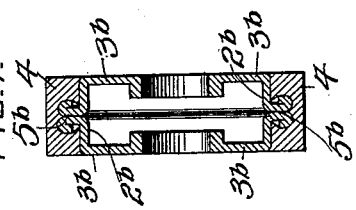
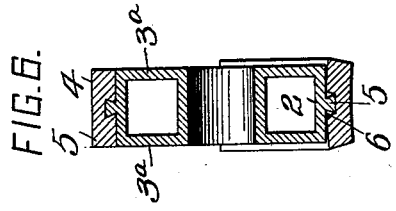
WITNESSES:
Herbert Hadley
F. E. Gaither
INVENTOR
James H. Baker
by Dennis Wolcott Att'y.

UNITED STATES PATENT OFFICE.

JAMES H. BAKER, OF ALLEGHENY, PENNSYLVANIA, ASSIGNOR TO JAS. H. BAKER MANUFACTURING CO., OF PITTSBURG, PENNSYLVANIA.

BRAKE-LEVER.

SPECIFICATION forming part of Letters Patent No. 674,592, dated May 21, 1901.

Application filed December 3, 1900. Serial No. 38,523. (No model.)

*To all whom it may concern:*

Be it known that I, JAMES H. BAKER, a citizen of the United States, residing at Allegheny, in the county of Allegheny and State of Pennsylvania, have invented or discovered certain new and useful Improvements in Brake-Levers, of which improvements the following is a specification.

The invention described herein relates to certain improvements in levers, the said improvements being especially applicable to levers for car-brakes.

The invention has for its object a construction wherein there is such a distribution of metal relatively to the strains to which the lever is subjected as to afford a maximum of strength with a minimum of material. Levers as now constructed afford ample strength in directions at right angles to the axis of the lever, but yield readily to strains in other directions and bend or twist laterally. It has been attempted to overcome this lateral weakness by increasing the thickness of the lever or of certain parts thereof. While this method is effective to increase the lateral strength of the levers, it involves an undue increase in the transverse size and weight of the lever.

In the accompanying drawings, forming a part of this specification, Figure 1 is a plan view of a brake-lever embodying my improvements. Fig. 2 is a transverse section of the same on a plane indicated by the line II II, Fig. 1. Fig. 3 is a plan view of a modification of the lever. Fig. 4 is a transverse section on a plane indicated by the line IV IV, Fig. 3. Fig. 5 is a view similar to Fig. 1, illustrating a further modification in the construction of the lever. Fig. 6 is a transverse section on a plane indicated by the line VI VI, Fig. 5. Fig. 7 is a view similar to Fig. 6, illustrating a modification in the construction of that form of lever; and Fig. 8 is a view similar to Fig. 2, illustrating a modification in the manner of constructing the form of lever shown in Figs. 1 and 2.

In the practice of my invention the lever may be formed of malleable cast-iron or of wrought-iron or steel. When formed of malleable cast-iron, the lever consists of a web portion 1 of sufficient width and thickness to withstand strains at right angles to the axis of the pivot and of a flange portion 2, designed to brace the web as against lateral bending or twisting, as shown in Figs. 1 and 2. While levers have been formed with web and flange portions, the latter, unless unduly increased in width or in weight, will not afford sufficient lateral strength, which, however, may be attained by forming ribs 3 along the inner edges of the flanges 2 on one or both sides of the lever. These ribs are arranged by preference parallel or approximately parallel to the web and serve not only to brace the lever laterally, but also in the direction of normal strains, reinforcing the web, which may be reduced in thickness provided the ribs 3 be made wider—*i. e.*, extend inwardly toward each other. As shown in Figs. 3 and 4, the ribs $3^a$ on one flange may be made integral with those of the other flange, in which case the web proper may be entirely omitted. In such case the portions $3^a$ would be made thinner than the web in the other form, while the flange portion 2 would be made as thick as practicable considering the character of the material employed, and by this I mean that the flange and rib portions should be so proportioned that in cooling the rib portions, which harden first, being thinner, will not be ruptured by the flange portions when solidifying.

In order to avoid the liability of one portion being ruptured by the other or thicker portion during solidification, the rib and flange portions $3^a$ and 2 may be made of equal or approximately equal thickness and the edges of the lever reinforced by a band 4 of wrought-iron or steel, as shown in Fig. 3. This band or rim 4 may be secured to the lever in any suitable manner known in the art—*i. e.*, by shrinking, bolting, &c; but it is preferred to secure it in position by a rib-and-groove construction, as shown. To this end a rib 5, preferably dovetailed in cross-section, is formed on the flange portion of the lever, and the band or rim is formed with a groove 6 in its inner wall. The band or rim is bent around against the edges of the lever and its ends welded together. The walls of the groove 6 are then closed down against the sides of the rib, firmly attaching the reinforcing band or rim on the lever.

In lieu of forming the body portion of the lever of cast metal, as stated, it may be formed of wrought-iron or steel plates $3^b$, as shown in Fig. 7. The edges of these plates are turned, as shown, to form flanges $2^b$, which have their edges turned out to form ribs $5^b$, onto which the walls of the rim or band 4 are closed, as in the construction shown in Fig. 7. In order that the rib and band may be more firmly interlocked, the edges of the ribs $5^b$ are turned over or folded to impart an approximately dovetail shape to the ribs.

The form of lever shown in Fig. 1 may be made of wrought-iron or steel by rolling a shape similar to an I-beam—i. e., with a web 1 and with flanges 2, as shown in Fig. 8—and then turning or bending the outer portions 7 of the flanges inwardly parallel or approximately parallel with the web portion 1 and drawing down and shaping the ends; or the shape shown in Fig. 8 may be drop-forged and the edges of the flanges turned over.

The holes or eyes for the reception of the pivot-pin and the rods connected to the ends of the lever may be formed in the web or bracing-ribs, as shown, in which case the metal of the rib or bracing-ribs would be increased slightly in thickness. The holes at the ends of lever having strengthening bands or rims may be formed in the latter, as described and shown in an application for Letters Patent, Serial No. 36,616, filed by me November 15, 1900.

I claim herein as my invention—

1. A brake-lever provided with flange portions extending around its sides and ends, said flange portions being provided with bracing or strengthening ribs formed integral therewith and extending inwardly from the edges of the flange portions, the lever being provided with means for attachment to the brake-rigging of a car, substantially as set forth.

2. A brake-lever provided with flange portions in combination with ribs for strengthening the flange portions, said ribs extending inwardly from the edges of the flange portions and formed integral therewith and with each other, the lever being provided with eyes for the reception of pins for connection to the brake-rigging of a car, the walls of said eyes being integral with the ribs, substantially as set forth.

3. A brake-lever provided with flange portions extending around its sides and ends and having means for attachment to the brake-rigging of a car in combination with ribs for bracing or strengthening the flange portions and extending inwardly from the edges of the flange portions and formed integral therewith and with each other, and a reinforcing band or rib firmly secured to the edges of the lever, substantially as set forth.

In testimony whereof I have hereunto set my hand.

JAMES H. BAKER.

Witnesses:
DARWIN S. WOLCOTT,
F. E. GAITHER.